United States Patent [19]

Oguchi et al.

[11] Patent Number: 4,718,060

[45] Date of Patent: Jan. 5, 1988

[54] STATION ARRANGEMENT IN DATA TRANSMISSION NETWORK

[75] Inventors: Kimio Oguchi; Akira Watanabe, both of Kanagawa, Japan

[73] Assignees: Nippon Telegraph & Telephone Corp.; Mitsubishi Denki Kabushiki Kaisha, both of Tokyo, Japan

[21] Appl. No.: 835,758

[22] Filed: Mar. 3, 1986

[30] Foreign Application Priority Data

Mar. 4, 1985 [JP] Japan .................................. 60-42313

[51] Int. Cl.⁴ .............................................. H04J 3/02
[52] U.S. Cl. .......................................... 370/85; 370/88
[58] Field of Search ................ 370/85, 94, 95, 86, 370/88

[56] References Cited

U.S. PATENT DOCUMENTS 4,380,065 4/1983 Hirtle et al. ............................ 370/85
4,535,450 8/1985 Tan ........................................ 370/94

Primary Examiner—Douglas W. Olms
Assistant Examiner—Wellington Chin
Attorney, Agent, or Firm—Bernard, Rothwell & Brown

[57] ABSTRACT

A station arrangement for implementing data transmission between stations linked through a transmission line comprises a central controller having a transmission line access function and a data packet relay function, and a plurality of terminal controllers connected through a system bus to the central controller, with a terminal unit connected to each terminal controller. Each terminal controller has a network protocol function besides the terminal control function.

5 Claims, 9 Drawing Figures

STATION ARRANGEMENT IN DATA TRANSMISSION NETWORK

BACKGROUND OF THE INVENTION

1. Field of the Invention

The present invention relates to a station arrangement used in a data transmission network, and particularly to an improved station arrangement to which user's equipments are connected.

2. Description of the Prior Art

FIG. 2 is a block diagram showing a prior art arrangement of stations S1 and S2. Both stations S1 and S2 have virtually the same internal structure, and in the following description their counterparts will be referred to by common symbols or by symbols with a suffix number 1 or 2 representing the stations only when their distinction is needed.

The stations S1 and S2 are linked together for data transaction with each other through a data transmission line, i.e., inter-system bus 1. Although in many cases, a large number of stations are connected to the bus 1, FIG. 2 shows only two stations for the sake of simplicity. Each station S incorporates a central controller CC, which is connected through a intra-system bus 2 with a desired number of terminal controllers TC, each of which is connected with a user unit T consisting of a terminal device or computer. The terminal controller TC functions to transfer user's data entered on the user unit T to the central controller CC or transfer data from the central controller CC back to the user unit T. The central controller CC has a function of network protocol for controlling the communication linkage between user units upon request, transmitting user's data packet to the destination, and confirming the data transmission, and a function of transmission line access control for implementing serial-parallel and parallel-serial conversion for the transmission of data packets and acknowledgement to another station S over a single transmission line, and arbitrating data transmission on a time-adjustment basis upon detection of data transmission conflict on a transmission line among stations.

In FIG. 2, the flow of user's data is shown by the arrows 21, 22, 23 and 26, the flow of data packet is shown by the arrow 24, and the flow of acknowledgement of data transmission is shown by the arrow 25. Although in FIG. 2 only two stations each accompanied by only two terminal controllers TC are shown for simplicity purposes, a network usually includes more stations S on the transmission line 1 and more terminal controllers TC on each system bus 2. The system bus 2 in FIG. 2 is used to transfer data between the central controller CC and each terminal controller CC, and the two terminal controllers CC on the system bus 2 cannot transact data directly with each other.

Next, the operation of the foregoing arrangement will be described. The first example of operation is data transmission from a user unit T11 to another user unit T12, and the second example is data transmission from a user unit T11 to a user unit T22 in another station. It is assumed that the destination of user's data is already under control of the network protocol function possessed by the central controller CC.

EXAMPLE 1

The terminal controller TC11 receives user's data from the user unit T11 and transfers it to the central controller CC1 through the system bus 2 as shown by the arrow 21. The central controller CC1 recognizes the destination of the user's data to be within the station, and transfers it through the system bus 2 to the terminal controller TC12. The terminal controller TC12 delivers the user's data to the user unit T12.

EXAMPLE 2

The terminal controller TC11 receives user's data from the user unit T11 and transfers it to the central controller CC1 through the system bus 2 as shown by the arrow 23. The central controller CC1 recognizes the destination of the user's data to be outside of the station, forms the data into a packet in accordance with the network protocol, and transfers it to the central controller CC2 in accordance with transmission line access control system as shown by the arrow 24. A long user's data may be divided into a number of short data packets.

Upon receiving the data packet, the central controller CC2 generates an acknowledgement packet in accordance with network protocol and sends it to the central controller CC1 in accordance with transmission path access control system as shown by the arrow 25. The central controller CC2 reassembles the user's data packet into the original data and transfers it to the terminal controller TC21 through the system bus 2 as shown by the arrow 26. The terminal controller TC21 delivers the user's data to the user unit T21.

In the conventional station constructed as described above, the central controller needs to implement network protocol and transmission line access control for all user units connected to its own station, and therefore business of the central controller imposes a stringent restriction of the number of user units connected. This is a problem of the conventional station arrangement.

SUMMARY OF THE INVENTION

It is an object of this invention to provide a station arrangement capable of connecting a larger number of user units than the conventional arrangement with a central controller of the same ability, by easing business of the central controller.

In one aspect of this invention, the station arrangement includes a plurality of terminal controllers each connected with a user unit, and a central controller connected through a system bus to the terminal controllers and also connected to a station bus, so that data is transacted through the bus with one or a plurality of stations connected commonly to the bus, wherein the terminal controller comprises a means for packeting data sent from a user unit, a first transmission means which transmits the data packet onto the system bus in accordance with network protocol, a reception means which operates in accordance with network protocol to receive the data packet on the system bus sent from other station, a means for reassembling data formatted suitably for the user unit from the data packet received by the reception means, and a second transmission means for transmitting the regenerated data to the user unit, and wherein the central controller comprises a bus access means which transfers the data packet from the first transmission means onto the bus, and a means for selectively transferring data packet destined to the self station onto the system bus.

DESCRIPTION OF THE PREFERRED EMBODIMENT

Figure 1:
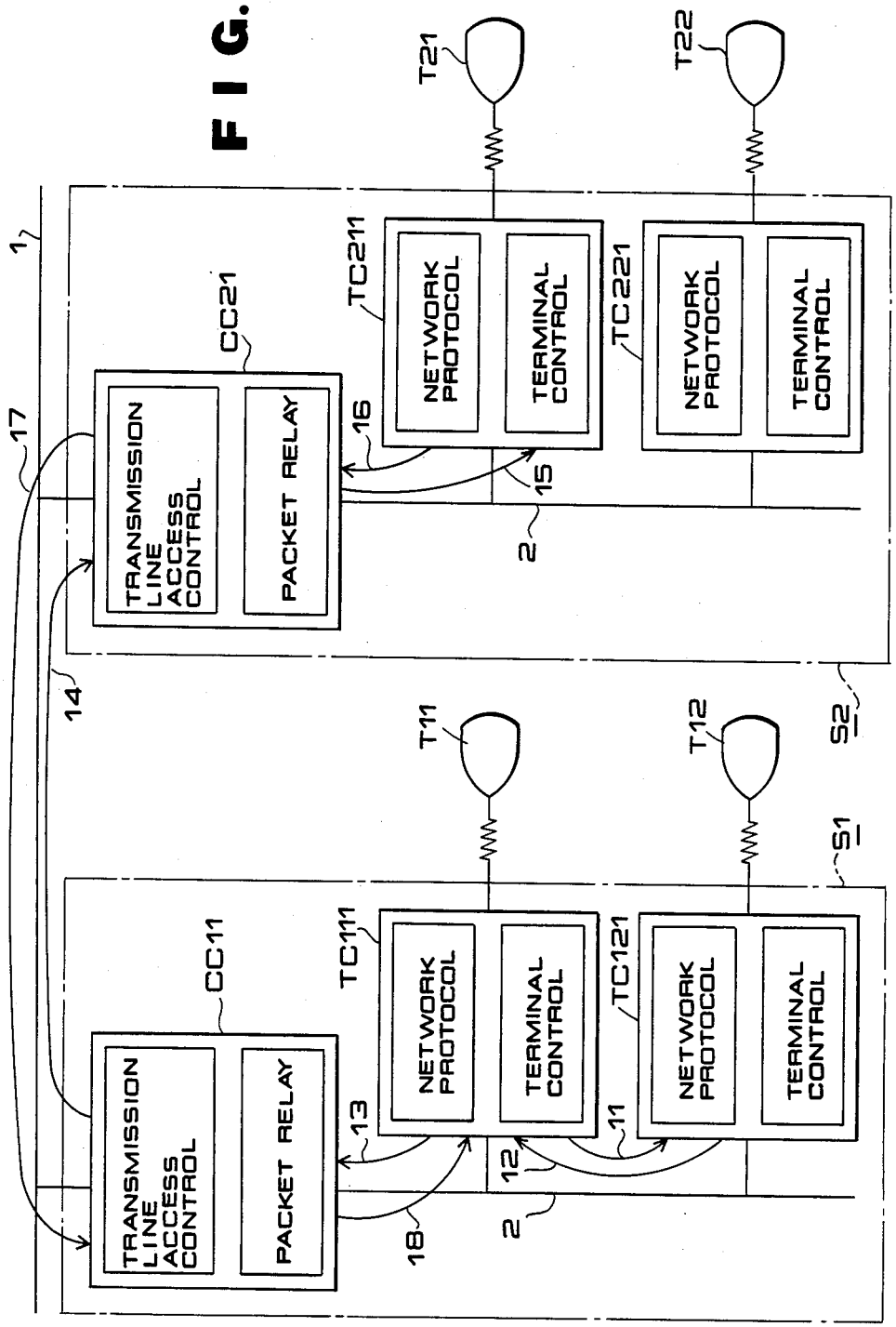
FIG. 1 is a block diagram showing the inventive station arrangement in which two stations are connected with each other through a bus.
Figure 2:
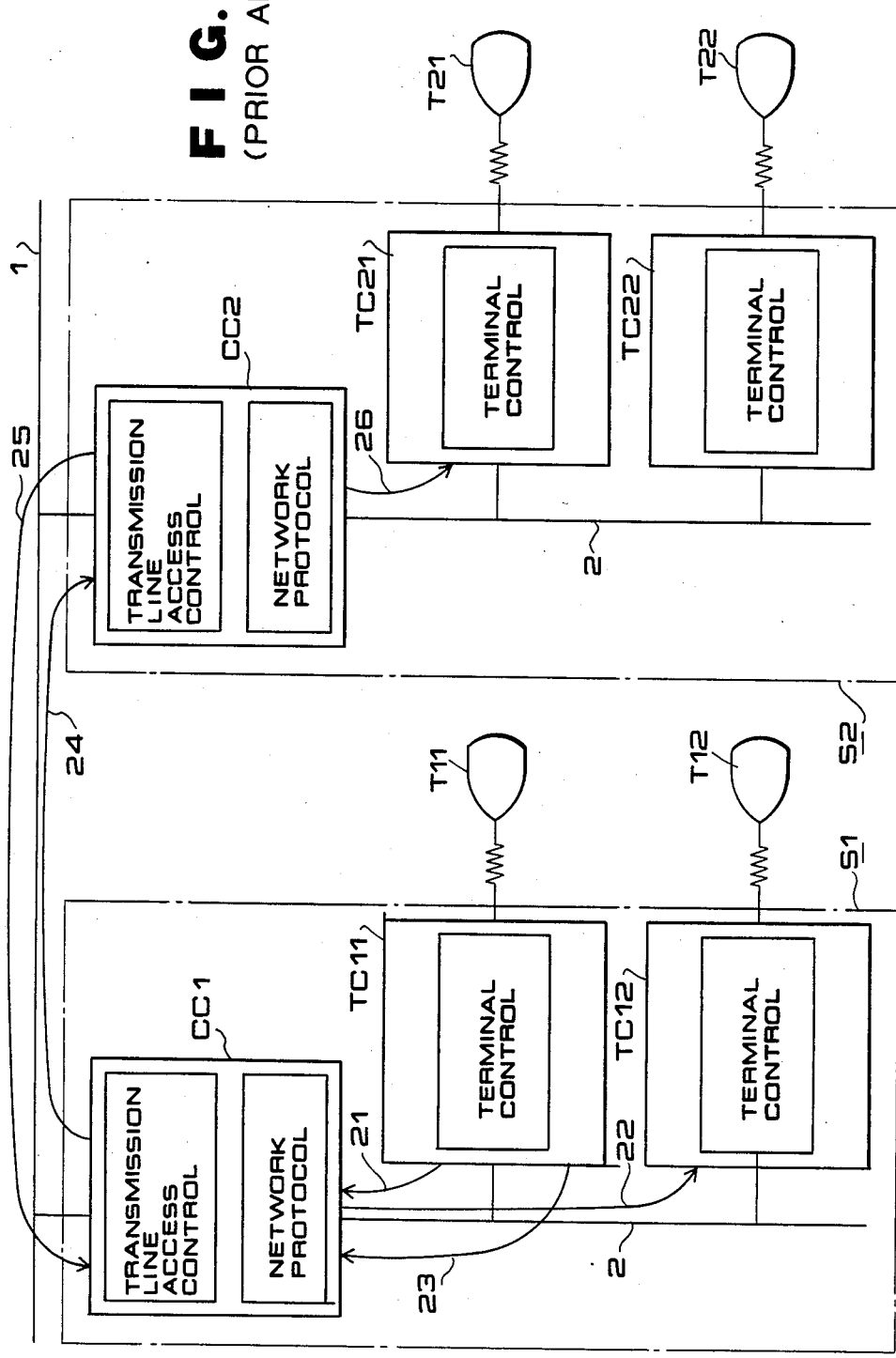
FIG. 2 is a block diagram, similar to FIG. 1, showing the conventional station arrangement.

In FIG. 1 showing the inventive station arrangement, the same or equivalent portions to those of FIG. 2 are referred to by the common symbols. Briefly, the inventive station arrangement differs from the conventional one in that the central controller CC can transact data directly with desired one of terminal controllers TC through the intra-system bus 2.

The terminal controller TC has the following functions.

(1) It controls the connection between user units T intended to have a communication, and implements network protocol including packet transmission of data sent from a user unit and confirmation of the data transmission.

(2) It controls user's data transaction with the associated user unit T. The central controller CC has the following functions.

(1) It implements transmission line access control for transmitting a data packet onto the transmission path.

(2) It sends out a data packet and acknowledgement packet from the associated terminal controllers destined to other station onto the transmission line using the transmission line acccss control function, and taking in a packet on the transmission line destined to the self station and transferring them to a partinent terminal controller.

In FIG. 1, the arrows 11, 13, 14 and 15 show the flow of a user's data packet, while the arrows 12, 16, 17 and 18 show the acknowledgements for the user's data packet. Actually, more than two stations are connected on the inter-system bus 1, and more than two terminal controllers are connected on the system bus 2, as in the case of FIG. 2.

Figure 3:
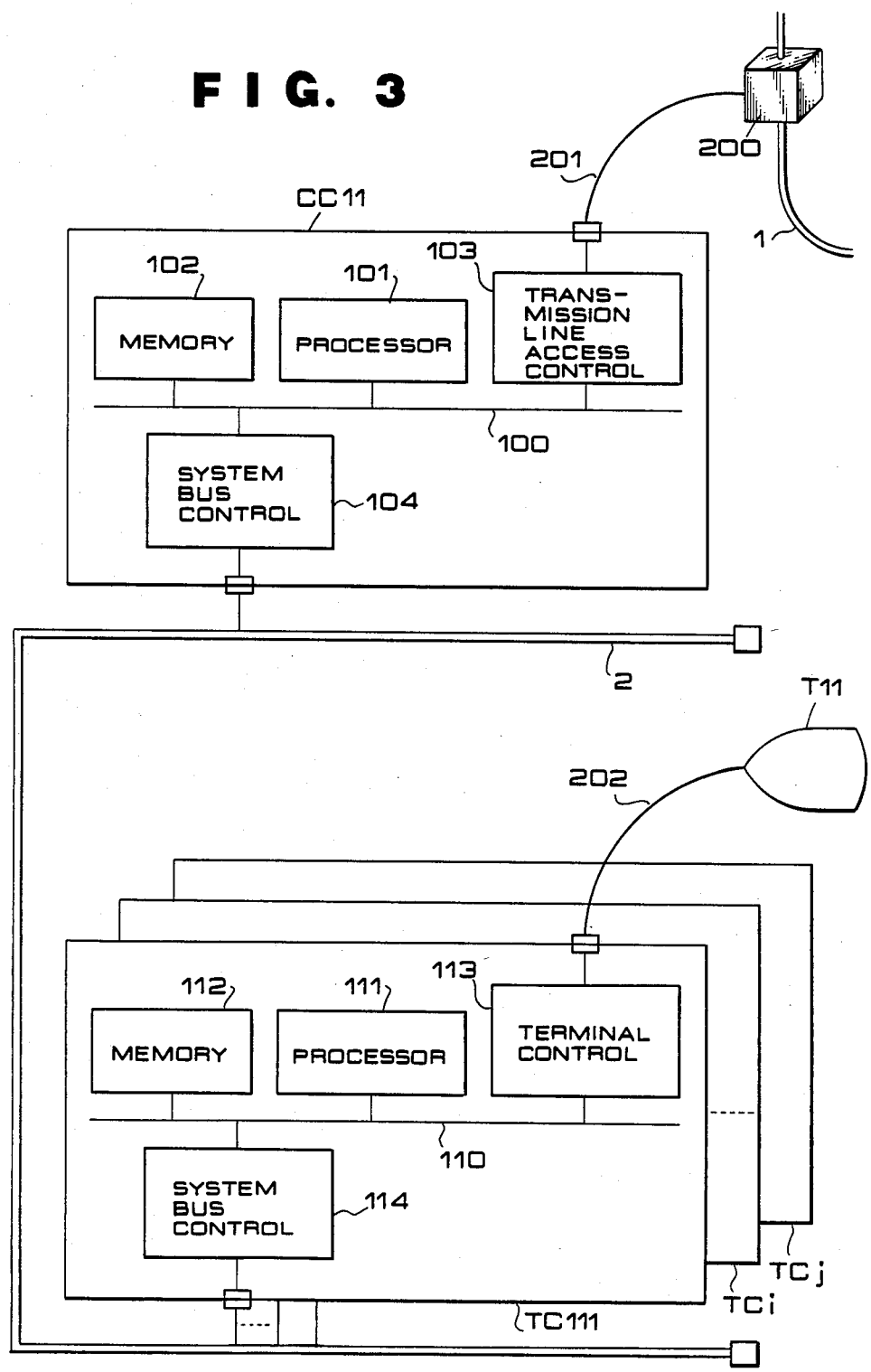
FIG. 3 is a block diagram showing in more detail the arrangement of the station shown in FIG. 1.

FIG. 3 shows in more detail the arrangement of the station S1. Other stations have the same structure, and the following description on the station S1 is applicable commonly to all stations. The station S1 has a central controller CC1, which includes a system bus control circuit 104 connected to the system bus 2, a processor 101, a memory 102 and a transmission line access control circuit 103, all in connection through a local bus 100. The circuit 103 is connected through a transceiver cable 201 to a transceiver 200 which has a physical interface with the bus 1.

The station S1 further includes in connection on the system bus 2 a plurality of terminal controllers TC111 . . . , TCi and TCj, which have the same structure and connect through terminal cables to respective terminal units T11. Each terminal unit includes a local bus 110 connected through a system bus control circuit 114 to the system bus 2, a processor 111 and a memory 112, both connected to the local bus 110, and a terminal control circuit 113 connected between the local bus 110 and the terminal unit T11.

The system bus 2 may be of a usual type, or may preferably be one which meets the following requirements.

(1) Ability of data block transfer in packets.

(2) Ability of direct data transfer between arbitrary terminal controllers.

(3) Disuse of a special device for bus access.

The bus 1, transceiver 200 and transceiver cable 201 are preferably of the types conformable to the IEEE 802.3 Standard (normally called "CSMA/CD Procedures") stated by the IEEE 802 Committee.

The terminal units may be existing ones having a usual communication means based on, for example, CCITT Recommendation X28. Other components including the terminal cables are selected to have interface specifications stated typically as CCITT V.24/V.28, and terminal units conformable to this standard can be connected to the terminal controllers.

Figures 4A, 4B:
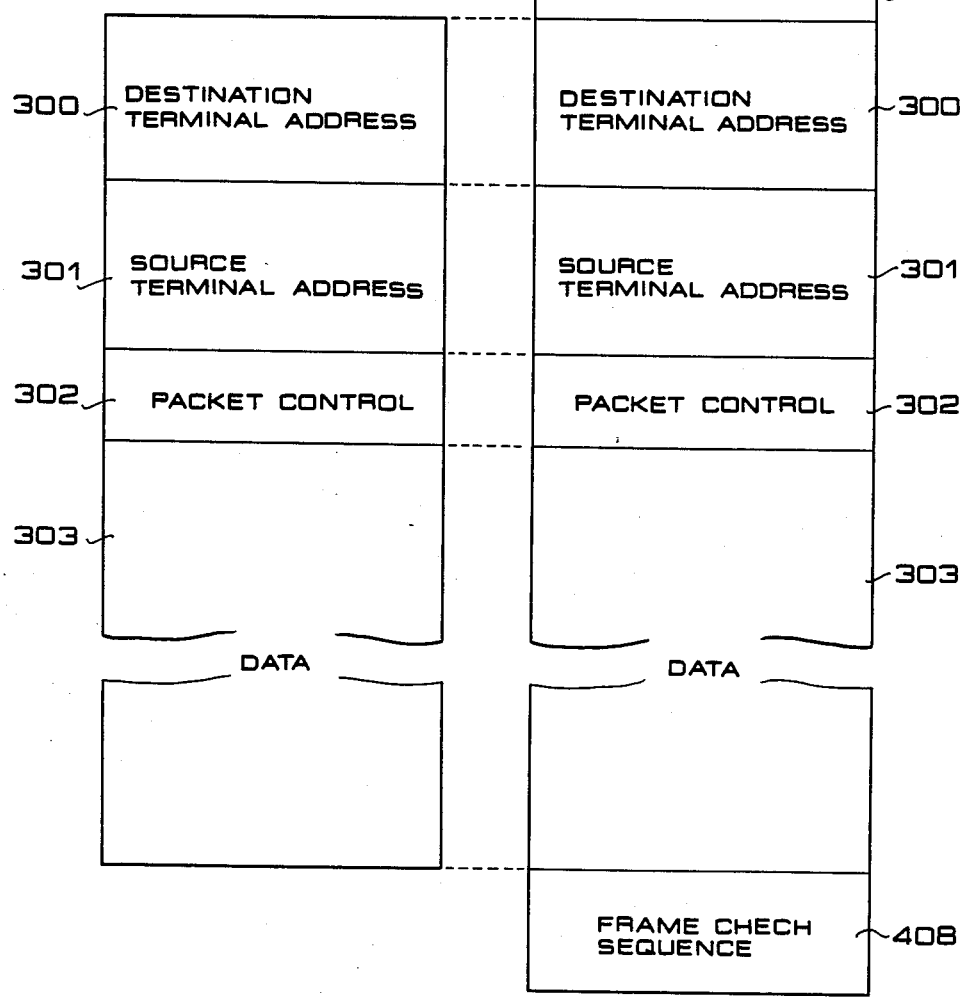
FIGS. 4a and 4b are a set of diagrams showing the information formats used in the embodiment of this invention.

FIGS. 4a and 4b show the information format applicable to the present invention on the bus 1 and system bus 2. The format includes the following sections.

300: The destination terminal address determined uniquely in the system.

301: The Source terminal address determined uniquely in the system.

302: Packet control information including information which indicates the packet format adopted in executing network protocol.

303: Packets of data from a terminal unit.

400: The preamble for establishing synchronization of station operation on the bus.

401: The frame start delimiter indicating the beginning of effective information on the bus.

402: The destination station address derived from the destination terminal address 300.

403: Source station address.

404: Information indicating the length of effective information.

405: The DSAP indicating the destination access point.

406: The SSAP indicating the source access point.

407: LLC control information including the information necessary in making bus access.

408: The frame check sequence for detecting errors in information on the bus.

The meaning and usage of the items 400–408 are completely conformable to the IEEE 802.2 (LLC) and 802.3 (MAC) which correspond to the layer 1 and the layer 2, respectively, of the seven layers of the Open System Interconnection (OSI) model (IS7498) as stated by the International Organization for Standardization (ISO).The LLC control uses type 1 (connectionless) and does not use DSAP (fixed value). The packet control information 302 and its usage are completely conformable to the CCITT Recommendation X.25 which corresponds to the standard for the layer 3 of the seven layers of the OSI model. This may be replaced by the standard for the layer 4.

Next, the operation of the foregoing arrangement will be described by taking an example of inter-station communication as in the case of FIG. 2. It is assumed that the destination of user's data is already under control of the terminal controllers TC having network protocol.

Intra-Station Data Transmission Procedure I

The terminal controller TC111 receives user's data from the user unit T11 and forms the data into a packet in accordance with its own network protocol. The terminal controller TC111 recognizes the user's data to be destined within the self station and transfers the packet directly to the terminal controller TC121 over the system bus 2 as shown by the arrow 11. A long user's data may be divided into a plurality of short packets. Upon receiving the packet, the terminal controller TC121 generates an acknowledgement packet in accordance with network protocol and sends it back to the terminal controller TC111. The terminal controller TC121 reforms the user's data packet into the original data and delivers it to the user unit T12.

Figure 5A:
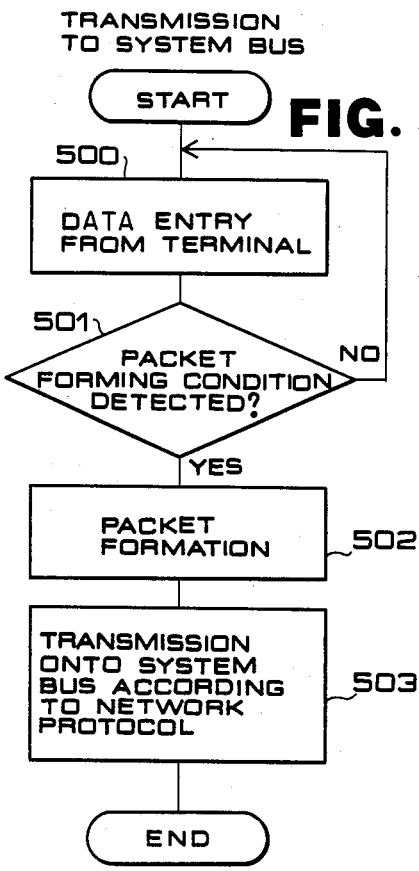
FIGS. 5a and 5b are flowcharts showing the operations of transmitting data onto the system bus and of receiving data from the system bus, respectively, by the inventive station arrangement.
Figure 5B:
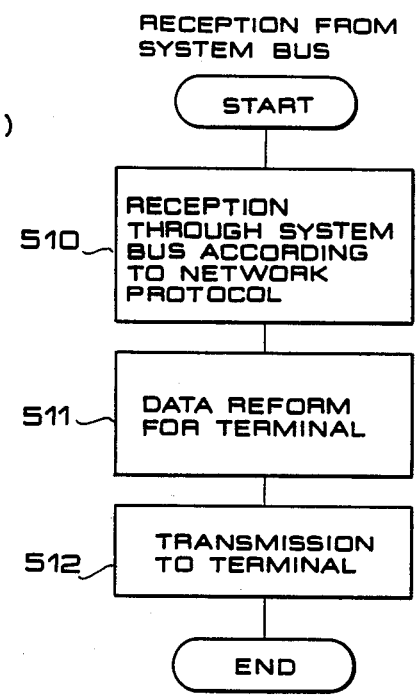

The transmission and reception operations to/from the system bus in the above data transmission operation are shown in the flowcharts of FIGS. 5a and 5b. The operation of each step is as follows.

Step 500: Data is entered through the terminal unit in accordance with the communication procedure of the terminal.

Step 501: Step 500 is repeated until the packet forming condition is detected. The condition is any of (a) detection of the terminating delimiter, (b) reaching of the stated data length, expiration of the timer count for packet formation, etc.

Step 502: A data packet as shown in FIG. 4a is produced in accordance with network protocol.

Step 503 The data packet is transmitted onto the system bus in accordance with the network protocol procedure (CCITT Recommendation X.25). This step may include the confirmation of transmission in accordance with X.25, and may also include the flow control.

Step 510: The data packet shown in FIG. 4a is taken in from the system bus in accordance with the network protocol procedure. This step may include the confirmation of transmission in accordance with X.25, and also may include the flow control.

Step 511: Output data is reformed in accordance with the communication procedure of the terminal.

Step 512: The data is outputted to the terminal unit in accordance with the communication procedure of the terminal.

Inter-Station Data Transmission Procedure II

The terminal controller TC11 receives user's data from the user unit T11 and forms it into a packet in accordance with network protocol. The terminal controller TC111 recognizes the user's data to be destined to the outside of the self station and transfers it to the central controller CC11 as shown by the arrow 13.

The central controller CC11 transfers the data packet to the central controller CC22 in the station S2 in accordance with transmission line access control system as shown by the arrow 14. Upon receiving the data packet, the central controller CC22 transfers it to the terminal controller TC211 as shown by the arrow 15. A long user's data may be formed into a plurality of packets for the transfer shown by the arrows 13, 14 and 15.

Upon receipt of the data packet, the terminal controller TC211 generates an acknowledgement packet according to network protocol and sends it to the central controller CC22 as shown by the arrow 16. The acknowledgement is delivered to the terminal controller TC111 as shown by the arrows 17 and 18, as in the same manner as for the data packet.

The terminal controller TC211 reforms the data packet into the original data and outputs it to the user unit T21.

Figure 6A:
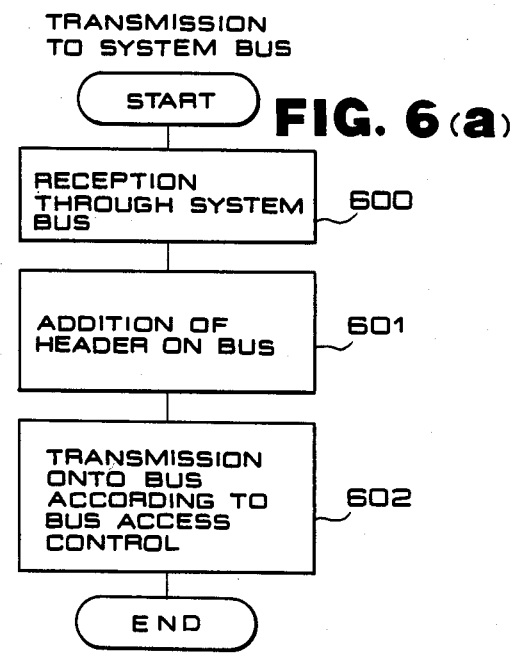
FIGS. 6a and 6b are flowcharts showing the operations of transmitLing data onto the bus and of receiving data from the transmission line, respectively, by the inventive station arrangement.
Figure 6B:
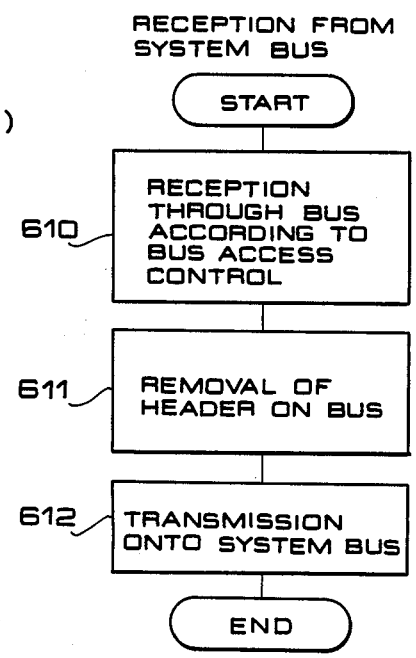

The transmission and reception operations to/from the bus by the central controller are shown in the flowcharts of FIGS. 6a and 6b.

Step 600: The data packet generated by the terminal controller is received through the system bus.

Step 601: Information to the bus is generated in the format as shown in FIG. 4b (addition of the header).

Step 602: The information is transmitted onto the bus in accordance with bus access control.

Step 610: The information formatted as shown in FIG. 4b is received in accordance with bus access control.

Step 611: The header is removed from the information on the bus, with the result as shown in FIG. 4a.

Step 612: The information is transmitted onto the system bus.

Although in the above embodiment the transmission bus 1 is used, it may be any transmission medium which delivers data packets correctly to the specified station, including a loop transmission line, a parallel data line, a radio communications system, and a public network such as a telephone network.

Although in the above embodiment each terminal controller 1 has one associated user unit, it may be connected with a plurality of user units to achieve the same effect.

As described above, the present invention introduces a system bus for the direct data transfer between arbitrary terminals and provides the network protocol function for the terminal controller, allowing the central controller solely to implement the transmission line access control and relay operation for data packets between stations, whereby processing of the central controller is reduced and consequently the restriction of the number of user units which can be connected to a station is eased.

What is claimed is:

1. A station arrangement including a plurality of terminal controllers each connected with a user unit, and a central controller connected through an intra-system bus with said terminal controllers and also connected to an inter-system bus, for implementing data transmission through said inter-system bus with one or more other stations connected commonly on said inter-system bus; each of said terminal controllers comprising:
(a) means for forming data sent from said user unit into a data packet:
(b) first transmission means for transmitting said data packet onto said intra-system bus in accordance with network protocol conformable to the procedure for layer 3 or layer 4 of the seven layers of the Open Systems Interconnection (OSI) model (IS 7498) stated by the International Organization for Standardization (ISO);
(c) means for receiving a data packet sent over said intra-system bus from another station, in accordance with the network protocol;

(d) means for reforming the data packet received by said reception means to have a format suitable for said user unit; and (e) second transmission means for transmitting the reformed data to said user unit; said central controller comprising:

(f) bus access means for transmitting the data packet from said first transmission means onto said inter-system bus by a procedure conformable to layer 1 and layer 2 of the seven layers of the OSI model and (g) means for taking in a data packet destined to the self station from said inter-system bus and sending the data packet onto said intra-system bus.

2. A station arrangement according to claim 1, wherein said first transmission means in said terminal controller functions to transmit the data packet onto said system bus in accordance with the network protocol.

3. A station arrangement according to claim 1 comprising a plurality of said terminal controllers connected to said intra-system bus.

4. A station arrangement according to claim 1, wherein a data packet on said intra-system bus has an information format comprising a destination terminal address, a source terminal address, packet control information, and data.

5. A station arrangement according to claim 1, wherein a data packet on said inter-system bus has an information format comprising a preamble for establishing synchronization on said bus, a frame start delimiter indicating the beginning of effective information on said bus, a destination station address generated basing on information pertaining to a destination terminal address, a source station address, information indicating the effective signal length, a DSAP indicating the destination access point, an LLC control information including information necessary for making access to said bus, a destination terminal address, a source terminal address, packet control information, data, and a frame check sequence.

* * * * *